(12) United States Patent
Zhao et al.

(10) Patent No.: US 7,517,382 B2
(45) Date of Patent: *Apr. 14, 2009

(54) PRODUCTION OF FINE PARTICLE COPPER POWDERS

(76) Inventors: Gang Zhao, 996 Saltwood Rd., Sumter, SC (US) 29154; Michael P. Pompeo, 925 Windrow Ct., Sumter, SC (US) 29150

( * ) Notice: Subject to any disclaimer, the term of this patent is extended or adjusted under 35 U.S.C. 154(b) by 251 days.

This patent is subject to a terminal disclaimer.

(21) Appl. No.: 11/342,605

(22) Filed: Jan. 31, 2006

(65) Prior Publication Data

US 2006/0236813 A1 Oct. 26, 2006

Related U.S. Application Data

(60) Provisional application No. 60/672,979, filed on Apr. 20, 2005.

(51) Int. Cl.
*B22F 9/24* (2006.01)
(52) U.S. Cl. .......................................... 75/373; 75/374
(58) Field of Classification Search .................. 75/373, 75/374
See application file for complete search history.

(56) References Cited

U.S. PATENT DOCUMENTS

| 4,735,676 A | 4/1988 | Iwasa |
| 4,997,674 A | 3/1991 | Parr et al. |
| 5,011,546 A | 4/1991 | Frazier et al. |
| 5,492,681 A | 2/1996 | Pasek et al. |
| 6,095,532 A | 8/2000 | Martin |
| 6,432,320 B1 | 8/2002 | Bonignore et al. |
| 6,646,147 B2 | 11/2003 | Richardson et al. |
| 6,875,252 B2 | 4/2005 | Sano et al. |
| 6,905,531 B2 | 6/2005 | Richardson et al. |
| 2001/0002558 A1 | 6/2001 | Sano et al. |
| 2004/0200318 A1* | 10/2004 | Kim et al. ..................... 75/252 |
| 2004/0221685 A1 | 11/2004 | Jeong et al. |
| 2006/0042416 A1* | 3/2006 | Yoon et al. ..................... 75/374 |

FOREIGN PATENT DOCUMENTS

| RU | 2111835 C1 * | 5/1998 |
| SU | 1082567 | 3/1983 |
| SU | 1082567 A * | 3/1984 |

OTHER PUBLICATIONS

Preparation of Very Finely Divided Copper By The Thermal Decomposition Of Copper Formate Monoethanolamine Complexes, Kimchenko, Y.I., et al, Poroshkovaya Metallurgiya, No. 5(245), p. 14-19 (May 1983).

Preparation of Nickel Powders in Nonaqueous Media, Macek, J. and Dejen, A., Fizika: A:4 (1995) 2, p. 309-314 (English).

* cited by examiner

*Primary Examiner*—George Wyszomierski
(74) *Attorney, Agent, or Firm*—Hayden Stone PLLC; Christopher G. Hayden

(57) ABSTRACT

A process for producing sub-micron-sized copper powder comprising the steps of: providing a precursor composition comprising a solution of copper monoethanolamine complex; and heating the precursor composition to a temperature wherein copper monoethanolamine complex is converted to copper powder. A process for producing nickel powder comprising the steps of: providing a precursor composition comprising a solution of nickel monoethanolamine complex; and heating the precursor composition to a temperature wherein nickel monoethanolamine complex is converted to nickel powder.

42 Claims, 2 Drawing Sheets

PRODUCTION OF FINE PARTICLE COPPER POWDERS

RELATED APPLICATIONS

This application claims priority to U.S. Provisional Application No. 60/672,979 filed on Apr. 20, 2005, the disclosure of which is incorporated herein for all purposes.

STATEMENT REGARDING FEDERALLY SPONSORED RESEARCH OR DEVELOPMENT

Not Applicable.

FIELD OF THE INVENTION

The present invention generally relates to compositions and methods for producing finely divided metal, for example copper, nickel, or mixture thereof, from compositions containing metal ions and an alkanolamine, preferably monoethanolamine, wherein the alkanolamine acts as a primary reducing agent. The invention more particularly relates to compositions and methods for producing micron and submicron copper and/or nickel metal powder from compositions comprising or consisting essentially of copper ions and/or nickel ions, inorganic anions, monoethanolamine, and optionally water.

BACKGROUND OF THE INVENTION

There are a variety of uses for fine copper powder, for example in Plasma Display Panels, Field Emission Displays, automobile lights and the like. Typically, the powder is formulated into a conductive metal paste material, which may be conductive on compression or alternatively on sintering. Copper (Cu) powder is employed in an electrically conductive paste material for multilayer passive devices, for example, a multilayer ceramic chip capacitor. Generally, micron-sized particles are useful for conductive pastes, such as described for example in U.S. Pat. Nos. 4,735,676, 4,997,674, and 5,011,546. The current generation of multilayer integrated circuit devices preferably utilize sub-micron copper powder, e.g., with a particle size ranging from 0.8 microns to about 0.1 microns, for example to produce the conductive material for inner electrodes on integrated circuits.

Many different methods have been proposed in the synthesis of a copper powder used in the conductive paste as described above, but they can generally be classified as either a gas phase method and a liquid phase method. Conventional methods for manufacturing metal powders have various problems such as a low yield due to wide particle size distribution, large particle size, low sphericity, and difficulty in controlling a degree of oxidation.

The gas phase method, also known as the gas atomization method, involves forcing high-pressure inert gas and molten copper through a nozzle with sufficient velocity to "atomize" the liquid metal, which on cooling yields a metal powder. Although this method is suitable for mass production, it is difficult to manufacture a nano-scaled powder with a commercially acceptable yield by this method. To obtain commercially acceptable product, oversized particles must be separated from the particles having a diameter in the preferred range. Such processes are difficult because powders are often irregularly shaped.

There is also a gas phase thermal decomposition method, where a copper-containing salt that has a weak binding force between metal and anion is thermally decomposed using a gas reducing agent and milled to obtain a metal powder. This method provides a fine metal powder. However, the metal powder may be burned during a heat treatment the burned powder is required to be milled and classified. Therefore, this method has a lower yield than a liquid phase reduction method.

In a gas phase evaporation method, an evaporation material is evaporated by heating in an inert gas or an active gas such as CH4 and NH4, and the evaporated gas is reduced with hydrogen and condensed to obtain a fine metal powder. This method is useful in preparing a metal powder having its particle size of 5 nm to several microns. However, productivity is very low and thus the metal powder is very expensive. A liquid phase reduction method is a well-known chemical method for manufacturing a metal powder. This method can more easily control the shape of the powder. Typically, a metal powder is prepared by a procedure comprising 1) forming a soluble first intermediate, 2) producing an insoluble intermediate product, and 3) adding a reducing agent. A conventional liquid phase reduction method for preparing a copper powder first has copper oxide (CuO) precipitated by adding sodium hydroxide (NaOH) to an aqueous copper sulfate solution, and the slurry is then filtered to separate particles from liquid. In a second step, a stable $Cu_2O$ solution is obtained by reacting the CuO with glucose or other monosaccharide having 6 carbons and an aldehyde group. When the color of the resulting solution changes to a dark red due to the production of $Cu_2O$, glycine and arabic gum are added to control the size and surface shape of the final copper powder. Then, a reducing agent, typically formalin or hydrazine, is added to reduce $Cu_2O$ to obtain a copper powder. The particle size of the copper powder varies depending on the conditions existing when each of the many reagents and additives are added, and thus it is difficult to control the particle size. Some improvements are discussed in Published U.S. Application 20040221685.

Published U.S. Application 2001/0002558 teaches a method of producing a copper powder that has an average particle diameter in the range of from not less than 0.1 micron to less than 1.5 microns, and having a small BET surface area. The copper powder is produced by conducting wet reduction of cuprous oxide into metallic copper powder in the presence of ammonia or an ammonium salt. The size of the copper powder is related to the size of the copper hydroxide formed in the first step and also to the size of the copper(I) oxide formed in the secondary reduction. In particular, an aqueous solution of a copper salt and an alkali are reacted to precipitate copper hydroxide. A primary-reduction step is conducted in the suspension to reduce the copper hydroxide obtained to cuprous oxide. Addition of a reducing agent to the obtained copper hydroxide suspension in order to reduce the copper hydroxide to cuprous oxide can be conducted by using a glucose as the reducing agent in the ordinary manner. This primary reduction step is preferably carried out under an inert gas atmosphere and increasing temperature (50-90° C.). Then, a secondary-reduction step is conducted in the suspension to reduce the cuprous oxide obtained to metallic copper, wherein before or in the course of the secondary-reduction step between about 0.01-0.1 moles ammonia per mole of copper and advantageously 1.1 times the chemical equivalent of hydrous hydrazine required for reducing the cuprous oxide to metallic copper. High density smooth surfaced metallic particles produced from this process enable the electrodes to form into solid sintered bodies with few pores by sintering at a low temperature.

U.S. Published Application 20040221685 describes a method for manufacturing a nano-scaled copper powder by a wet reduction process, comprising adding appropriate amounts of sodium hydroxide and hydrazine to an aqueous copper chloride solution to finally obtain a copper powder having a particle size of 100 nm grade via an intermediate product such as a copper complex. CuO is precipitated by adding sodium hydroxide to an aqueous copper sulfate solution. In a second step, a stable $Cu_2O$ solution is obtained by reacting the obtained CuO with glucose ($C_6H_{12}O_6$), a representative aldohexose (a monosaccharide having 6 carbons and an aldehyde group). An amino acid, e.g., glycine, and arabic gum are added to the $Cu_2O$ solution, and then hydrazine is added to the mixture to thereby reduce $Cu_2O$ to obtain a copper powder as a precipitate. The glycine and arabic gum as the third additives are added to control the size and surface shape of the final copper powder. This patent also describes forming a complex of hydrazine (an amine) and soluble copper salts, and then precipitating copper powder by admixing therein an alkali.

Preparation of Very Finely Divided Copper By The Thermal Decomposition Of Copper Formate Monoethanolamine Complexes, Kimchenko, Y. I., et al, Poroshkovaya Metallurgiya, No. 5(245), pg. 14-19 (May 1983) describes and compares the processes of forming copper powder by the thermal decomposition of copper formate versus the thermal decomposition of a copper-monoethanolamine formate complex. Monoethanolamine (MEA) is a known alternative to ammonia to form aqueous soluble complexes of copper. To get high concentrations of the dissolved complex in the solution, there must be a supply of anions to form the stable copper-MEA-anion complex, and commercially the anion is carbonate, chloride, nitrate, borate, citrate, sulfate, acetate, or the like. Low molecular weight organic acids such as formic acid and oxalic acid are a known reducing agent. In this work, the composition did not comprise much water, as copper formate dihydrate was dissolved in straight MEA to form the starting mixture. Formation of metallic copper by thermal decomposition of copper formate dihydrate (or alternatively from copper oxalate) is known. When decomposing copper formate, there are two isotherms shown in a differential thermal analysis. The first, hitting a maximum at about 380° K. (107° C.) corresponds to the dehydration of the dihydrates, while the second, hitting a maximum at about 453° K. (180° C.) corresponds to the decomposition of formate and the formation of metallic copper. When a copper-monoethanolamine-formate solution is used, the differential thermal analysis shows five endotherm effects. The first isotherm at 384° K. (111° C.) relates to dehydration, the second isotherm at 405° K. (132° C.) relates to detachment and removal of 1 mole of MEA, and the third isotherm at 419° K. (146° C.) relates to decomposition of the complex and the formation of metallic copper (formed at temperatures as low as 139° C.). The remaining isotherms relate to boiling off/condensing the remaining organics. While this method is useful, the use of copper formate as a precursor is expensive. Further, the paper noted the resultant copper powder had, as a result of uncompensated surface forces, crystal lattices in a state of dis-equilibrium, having macro- and micro-stresses therein.

There is a need for cost-effective method of preparing stable copper powder that does not require one or more low molecular weight organic acids, e.g., formate ions and/or oxalate ions, or expensive and unstable reducing agents such as hydrazine, for each copper ion.

SUMMARY OF THE INVENTION

The invention generally includes methods for producing finely divided metal, for example copper, nickel, or mixture thereof, from compositions containing metal ions and an alkanolamine, preferably monoethanolamine, and optionally water, salts, and/or inorganic acids, by thermal decomposition where the alkanolamine acts as a primary reducing agent. The invention in one embodiment includes a process of reducing ethanolamine-complexed copper ions in a precursor composition to copper metal. The invention more particularly relates to compositions and methods for producing micron and submicron copper metal and nickel metal powder from compositions comprising or consisting essentially of copper ions and/or nickel ions, inorganic anions, monoethanolamine, and optionally water.

In one aspect, the invention provides for a process for producing micron-sized to sub-micron-sized copper powder comprising the steps of: providing a precursor composition comprising a solution of more than 5% copper ions and more than 20% monoethanolamine, by weight, with the proviso that there is less than 0.8 moles of a low molecular weight organic acid per mole of copper ions; and heating the precursor composition to a temperature wherein the copper ions are converted to copper powder, said powder having greater than 90% by weight copper and having a mean diameter of between about 0.02 microns and about 5 microns. The invention may include several embodiments. The reduction is performed at a temperature between 90° C. and 150° C., preferably between 130° C. and 155° C. Preferably, the composition comprises less than 0.4 moles of the low molecular weight organic acid per mole of copper ions. The composition may further comprise less than 0.4 moles total of the low molecular weight organic acid and of hydrazine per mole of copper ions. Preferably, there is less than 0.4 moles hydrazine is present per mole of copper ions in the precursor composition. Preferably, the precursor composition comprises less than 0.1 moles of a low molecular weight organic acid per mole of copper ions. Most preferred, the composition is substantially free of the low molecular weight organic acid and/or of hydrazine. The reduction may be performed wherein at least a portion of the copper ions in the precursor composition are in the form of particles of copper salts, copper hydroxides, copper oxides, or mixtures or combinations thereof. The reduction is performed having a mole ratio of monoethanolamine to copper ions of at least 1.5:1. The reduction is performed wherein at least one mole of monoethanolamine is consumed per mole of copper powder formed. The resulting copper powder has a mean diameter of between about 0.2 microns and about 1.3 microns. Advantageously and preferably, the precursor composition comprises more than 12% copper, more than 25% monoethanolamine, and more than 0.2% of a counterion, wherein less than one half the equivalents of the counterion are low molecular weight organic acids.

In another aspect, the invention provides for a process for producing micron-sized to sub-micron-sized copper powder comprising the steps of: providing a precursor composition comprising copper ions and monoethanolamine, with the proviso that the mole ratio of ethanolamine to copper ions is at least 1 and there is less than 0.4 moles total of a low molecular weight organic acid and hydrazine per mole of copper ions; and heating the precursor composition to a temperature wherein the copper ions are converted to copper powder, said powder having greater than 90% by weight copper and having a mean diameter of between about 0.02 microns and about 5 microns. This aspect of the invention may include several embodiments. The reduction is performed where no common reducing agents are added to the precursor composition. The precursor composition comprises less than 0.1 moles of a low molecular weight organic acid per mole of dissolved copper ions. Preferably, the precursor composition is substantially free of the low molecular weight organic acid. The reduction is performed at a temperature between 90° C. and 150° C., preferably between 130° C. and 155° C. The reduction is performed where at least one mole of monoethanolamine is consumed by the reduction process per mole of copper powder formed.

In a third aspect, the invention provides for a process for producing micron-sized to sub-micron-sized copper powder comprising the steps of: providing a precursor composition consisting essentially of copper ions, monoethanolamine, an inorganic counterion, optionally water, and optionally an reducing sugar, wherein the mole ratio of monoethanolamine to copper ions is at least 1:1; and heating the precursor composition to a temperature wherein copper ions are converted to copper powder, said powder having greater than 90% by weight copper and having a mean diameter of between about 0.02 microns and about 5 microns. This aspect of the invention may include several embodiments. The reduction is performed where no common reducing agents are added to the precursor composition. Preferably the reduction is performed where the precursor composition comprises less than 0.1 moles of low molecular weight organic acid per mole of copper ions. Preferably, the reduction is performed where the precursor composition is substantially free of low molecular weight organic acid. The reduction is performed at a temperature between 90° C. and 150° C., preferably between 130° C. and 155° C. The reduction is performed wherein at least one mole of monoethanolamine is consumed by the reduction process per mole of copper powder formed. The reduction is performed where the mole ratio of monoethanolamine to copper ions is at least 1.5:1.

In another aspect, the invention provides for a process for producing micron-sized to sub-micron-sized metal powder comprising the steps of: providing a precursor composition comprising monoethanolamine-reducable metal ions and monoethanolamine, wherein the monoethanolamine-reducable metal ions each have a standard reduction potential from about −0.30 volts to about 0.6 volts in water solution at 25° C., and wherein the mole ratio of monoethanolamine to monoethanolamine-reducable metal ions is at least 1:1, with the proviso that the precursor composition comprises less than 0.8 moles total of metal-reducing-organic acids and of hydrazine per mole of monoethanolamine-reducable metal ions; and heating the precursor composition to a temperature wherein the metal ions are converted to metal powder, said powder having a mean diameter of between about 0.02 microns and about 5 microns. This aspect of the invention may include several embodiments. The reduction is performed wherein the temperature is between 90° C. and 150° C., preferably between 130° C. and 155° C. The reduction is performed where the composition comprises less than 0.8 moles of metal-reducing-organic acids per mole of monoethanolamine-reducable metal ions. The reduction is performed where the composition comprises less than 0.4 moles total of metal-reducing-organic acids and of hydrazine per mole of monoethanolamine-reducable metal ions. The reduction is performed where at least half of the moles of monoethanolamine-reducable metal ions comprise copper ions, nickel ions, or both. The reduction is performed where at least a portion of the monoethanolamine-reducable metal ions in the precursor composition are in the form of particles of metal salts, metal hydroxides, metal oxides, or mixtures or combinations thereof. The reduction is performed where the mole ratio of monoethanolamine to monoethanolamine-reducable metal ions is at least 1.5:1. The reduction is performed such that the metal powder has a mean diameter of between about 0.2 microns and about 1.3 microns.

In a fifth aspect, the invention provides for process for producing micron-sized to sub-micron-sized nickel powder comprising the steps of: providing a precursor composition comprising nickel ions and monoethanolamine, wherein the mole ratio of monoethanolamine to nickel ions is at least 1:1, with the proviso that the precursor composition comprises less than 0.8 moles total of nickel-reducing-organic acids and of hydrazine per mole of monoethanolamine-reducable nickel ions; and heating the precursor composition to a temperature wherein the nickel monoethanolamine complex is converted to nickel powder. This aspect of the invention may include several embodiments. The reduction is performed where the temperature is between 90° C. and 150° C., preferably between 130° C. and 155° C. The reduction is performed where the composition comprises less than 0.8 moles of nickel-reducing-organic acids per mole of nickel ions. The reduction is performed where the composition comprises less than 0.4 moles total of nickel-reducing-organic acids and of hydrazine per mole of nickel ions. The reduction is performed where the at least a portion of the nickel ions in the precursor composition are in the form of particles of metal salts, metal hydroxides, metal oxides, or mixtures or combinations thereof. The reduction is performed where the mole ratio of monoethanolamine to nickel ions is at least 1.5:1. The reduction is performed such that the nickel powder has a mean diameter of between about 0.2 microns and about 1.3 microns.

The invention includes a method of manufacturing fine particle copper powders by 1) providing the precursor composition comprising copper ions, finely devided copper salts, or both and and alkanolamine, preferably an ethanolamine, more preferably monoethanolamine, and 2) reducing the copper ions through thermal decomposition of the precursor composition. Advantageously and preferably the reduction is performed in the absence of other reducing agents, e.g., formates, oxalates, hydrazine, and the like. Advantageously and preferably the reduction of copper ions that are complexed in the precursor composition, more particularly the reduction of copper ions in a copper monoethanolamine ("MEA") based precursor solution, results in the production of fine, micron-sized to sub-micron-sized particles of copper metal.

Initial experiments were conducted on an aqueous copper MEA carbonate composition, and the process involved heating the composition to temperatures between about 70° C. which were slowly ramped up to a maximum of about 140° to 150° C. This process yielded uniform copper powders of primary particle size between 1-2 microns. In an aqueous copper MEA carbonate composition, water is a carrier, copper is the complexed metal, MEA are the complexing ligands, and carbonate is the counterion.

The invention also include a process of reducing nickel ions in a precursor composition comprising monoethanolamine to nickel metal powder by thermal decomposition. The invention includes a method of manufacturing fine particle nickel powders by 1) providing the precursor composition, and reducing the nickel ions through thermal decomposition of the precursor composition. Advantageously and preferably the reduction of nickel ions that are complexed in the precursor composition, more particularly the reduction of nickel ions in a nickel monoethanolamine ("MEA") based precursor solution, results in the production of fine, micron-sized to sub-micron-sized particles of nickel metal. Initial experiments were conducted on an aqueous nickel MEA sulfate composition with added hydroxide ions, and the process involved heating the composition to temperatures between about 70° C. to a maximum of about 150° C. This process yielded nickel powders. In an aqueous nickel MEA composition, water is a carrier, nickel is the complexed metal, MEA are the complexing ligands, and sulfate is the counterion.

Advantageously and preferably the reduction of copper ions, nickel ions, optionally tin ions, optionally zinc ions, or any combinations thereof is performed in the absence of other reducing agents, e.g., formates, oxalates, hydrazine, and the like. Ethanolamine, preferably monoethanolamine, provides the principal reducing agent. In some embodiments glucose or the like can be added to a composition comprising copper (II) ions, as this is a cost-effective method of producing copper(I) ions. In such embodiments, an alkanolamine, preferably monoethanolamine, provides the principal reducing agent for reducing copper(I) ions to copper metal.

Surprisingly, if the reduction process of the current invention is not taken to completion, and starting with copper(II) ions, particles comprising or consisting essentially of copper (I) oxide, or of a mixture of copper(I) oxide and copper metal, can be obtained.

LIST OF FIGURES

DESCRIPTION OF EMBODIMENTS OF THE INVENTION

Figure 1:
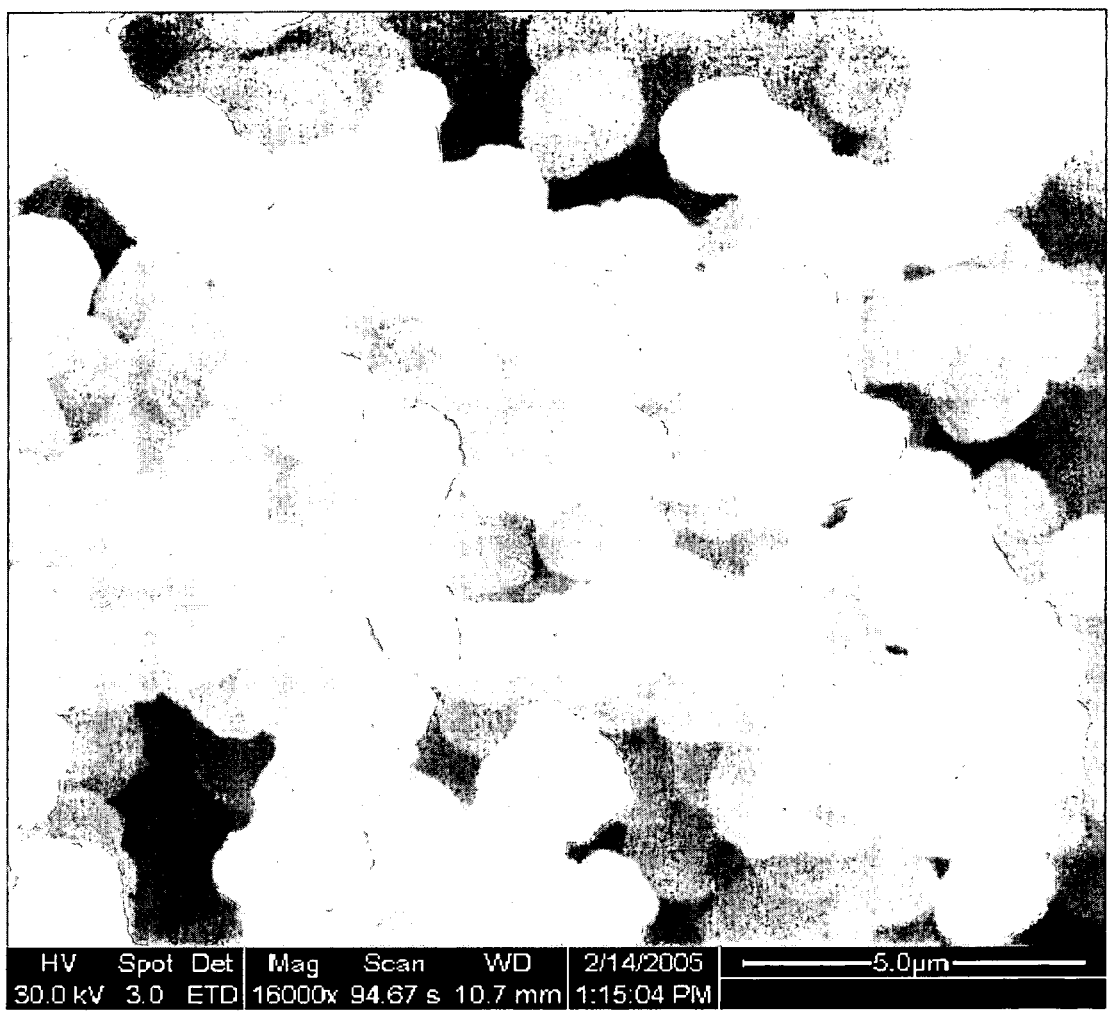
FIG. 1 is a scanning electron micrograph of copper powder produced by a method of the invention using an aqueous Copper/Monoethanolamine/Carbonate solution as the precursor composition, without subsequent milling or treatment.
Figure 2:
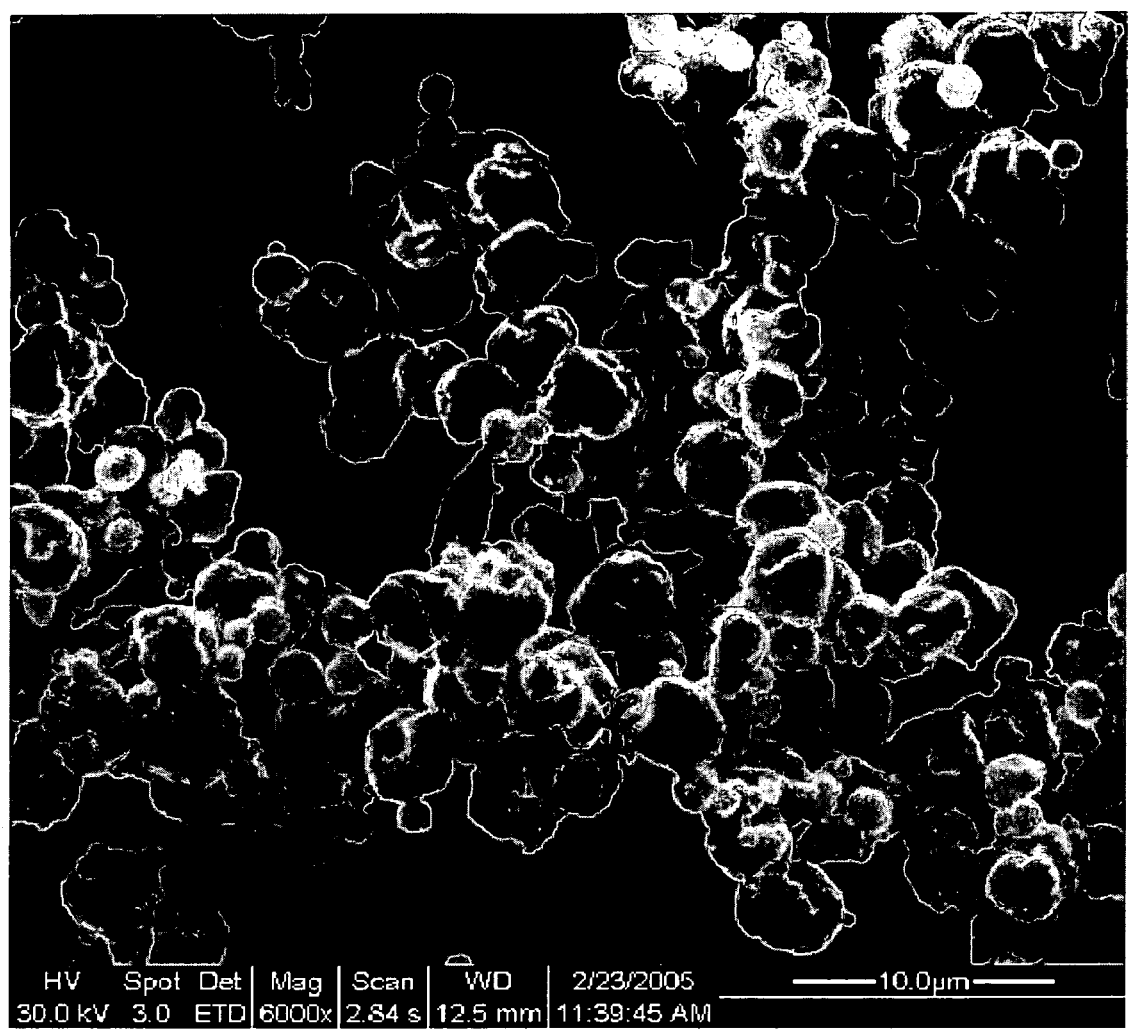
FIG. 2 is a scanning electron micrograph of copper powder produced by a method of the invention using an aqueous Copper/Monoethanolamine/Carbonate solution having particulate basic copper carbonate added thereto as the precursor composition, without subsequent milling or treatment.

As used herein, unless specified, all percents are percent by weight.

In one embodiment, where the precursor composition comprises an aqueous solution of complexed copper(II) ions, the precursor composition comprises at least 8% copper, preferably at least 10% copper, and more preferably at least 12% copper. The precursor composition advantageously comprises at least 3 moles, preferably between about 3.5 and about 4 moles, of monoethanolamine per mole of copper(II) ions to be complexed. If the precursor composition comprises copper(I) ions, then the composition advantageously additionally comprises at least 1.5 moles, preferably between about 1.75 and about 2 moles, of monoethanolamine per mole of copper(I) ions to be complexed. Excess monoethanolamine has no negative effects, other than the process eventually requires energy to remove the excess monoethanolamine from the reaction mixture, for example by distillation. Nickel can partially or completely replace copper in this embodiment, where nickel replaces copper on a mole for mole basis. In another embodiment, up to about one half, but preferably less than one quarter, and more preferably less than one sixth, the moles of copper ions can be replaced with other metals, for example nickel, zinc, tin, and the like. Such mixtures may be useful in formulating alloy powders having a melting temperature below that of copper, for example.

In some embodiments where all the metal ions, for example copper ions, are complexed and in solution in the precursor composition, there is between 2.5 and 4 moles of ethanolamine, preferably monoethanolamine, per mole of metal ions (e.g., copper) to be reduced to metal powder. In an alternate embodiment, the invention also encompasses embodiments wherein up to one half, but preferably one third or less, of the moles of monoethanolamine in a precursor composition are replaced by other alkanolamines capable of complexing copper ions in an aqueous composition, e.g., diethanolamine, triethanolamine, and/or isopropanolamine. In some embodiments a precursor composition comprising triethanolamine and/or diethanolamine, in combination with MEA, is preferred. Under some conditions we believe their higher —OH to formula ratio is advantageous for the copper reduction. In other embodiments, the composition is substantially free, e.g., has less than 2%, of these other alkanolamines, and monoethanolamine is the primary reducing agent.

Advantageously there is at least 1 mole, preferably at least 1.5 moles of alkanolamine, preferably ethanolamine, more preferably monoethanolamine, per mole of metal ions to be reduced to metal powder. Advantageously, for metal ions such as copper(I) ions with a charge of positive one, it is advantageous to have at least 1 mole, preferably at least 1.5 moles of ethanolamine, preferably monoethanolamine, per mole of metal ions. Advantageously, for metal ions such as copper(II) ions with a charge of positive two, it is advantageous to have at least 1.5 moles, preferably 2 moles, of ethanolamine, preferably monoethanolamine, per mole of metal ions. Inclusion of a reducing sugar or other non-alkanolamine agent useful for reducing copper(II) ions to copper(I) ions will reduce the amount of alkanolamine needed for full conversion of metal ions to metal powder.

In another alternate embodiment, the invention also encompasses embodiments wherein up to one half, but preferably one third or less, of the moles of monoethanolamine in a precursor composition are replaced by other organo-amines capable of complexing copper ions in an aqueous composition, e.g., ethylene diamine. Generally, these embodiments are less preferred because the starting components are more costly and can require more energy to remove these other amines from the reaction mixture, and recovery of product may encounter difficulties if a sludge is formed. Preferably, the composition is substantially free, e.g., has less than 2%, of these other organo-amines. In yet another alternate embodiment, the invention also encompasses embodiments wherein up to one third of the moles of monoethanolamine in a precursor composition are replaced by ammonia. Preferably, the composition is substantially free, e.g., has less than 1%, and more preferably less than 0.1% or 0%, of ammonia. Alternately, the reaction mixture comprises between 0.001 moles and 0.1 moles of ammonia per mole of metal ions to be reduced, e.g., copper.

It is known that copper can be dissolved directly into ethanolamine. This can be very economical, as described for example in U.S. Pat. Nos. 6,905,531 and 6,905,532, the disclosures of which are incorporated herein by reference. Compositions made by such methods as are described in those patents comprise significant amounts of water. Generally, water is not preferred in precursor compositions. It is believed that most water is distilled from the precursor composition before the temperature necessary for the reduction of copper or nickel ions by monoethanolamine can proceed at a useful rate. For this reason, advantageously the composition comprises less than 50% water, preferably less than 35% water, more preferably less than 20% water.

Generally, as described in U.S. Pat. Nos. 6,905,531 and 6,905,532, concentrated solutions of metal ions complexed by monoethanolamine in water are made more stable by the addition of a small amount of salts and/or acids, typically between 0.2 and 1.2 equivalents of salts and/or acid per 4 moles of ethanolamine, e.g., of monoethanolamine. The acids are preferably mineral acids. Mineral acids are significantly less expensive than are organic acids. More preferably the acid is volatile at temperatures at or below 150° C., so that the acid is vaporized during the heating/reducing process. Carbonic acid is a preferred acid. Hydrochloric acid is also useful. The presence of reducing organic acids such as formic acid are not preferred. The formic acid in monoethanolamine will reduce copper ions to copper metal, but careful analysis of the temperature plateaus during such reactions indicate the monoethanolamine does not participate in the reduction process, at least until the formic acid is exhausted. Therefore, most if not all of the monoethanolamine in the precursor composition is not utilized in the reduction of copper ions, and the cost of the process is increased by the inclusion of expensive yet non-operative ingredients. While inexpensive organic acids such as acetic acid may be useful, expensive organic acids are not preferred.

The precursor composition may be formed by fully dissolving or by partially dissolving metal salts, e.g., copper salts and/or nickel salts, in alkanolamine, preferably ethanolamine, for example monoethanolamine. The salts can be hydroxide salts such as copper hydroxide, sulfate salts such as copper sulfate, carbonate salts such as copper carbonate or basic copper carbonate, chloride salts such as copper chloride or copper oxychloride, and the like. The salts can be dissolved in the precursor composition, or the salts can exist as particles in the precursor composition, though typically, at least some of the salts are dissolved as ethanolamines, and particularly monoethanolamine, rapidly solvate various copper and nickel salts to saturation.

It is possible to have solid copper salts and/or copper oxides contracting the alkanolamine in the precursor composition. Then, the particle size of the precursor salts is believed to have a strong influence on the degree of conversion of copper ions to copper metal, and also on the particle size of the resultant copper salts.

As used herein, particle diameters may be expressed as "dxx" where the "xx" is the weight percent (or alternately the volume percent) of that component having a diameter equal to or less than the dxx. The d50 is the diameter where 50% by weight of the component is in particles having diameters equal to or lower than the d50, while just under 50% of the weight of the component is present in particles having a diameter greater than the d50. Particle diameter is preferably determined by Stokes Law settling velocities of particles in a fluid, for example with a Model LA 700 or a CAPA™ 700 sold by Horiba and Co. Ltd., or a Sedigraph™ 5100T manufactured by Micromeritics, Inc., which uses x-ray detection and bases calculations of size on Stoke's Law, to a size down to about 0.15 microns. Smaller sizes may be determined by a dynamic light scattering method, preferably with a laser-scattering device, but are preferably measured by direct measurements of diameters of a representative number of particles (typically 100 to 400 particles) in SEM photographs of representative sub-0.15 micron material. For particles between about 0.01 microns and about 0.15 microns, the particle size can be determined by taking SEMs of representative particles within the size range and measuring the diameter in two directions (and using the arithmetic average thereof) for a representative sample of particles, for example between 100 particles to about 400 particles, where the relative weight of the particles within this fraction are assumed to be that weight of a spherical particle having a diameter equal to the arithmetic average of the two measured diameters, and wherein the total weight of the sub-0.2 micron fraction is advantageously normalized to a reported "<0.15 micron" fraction determined from the hydrodynamic settling test.

Wet ball milling (or an equivalent milling process) of copper salts and/or oxides can readily remove by attrition particles having a size over 1 micron. The size distribution of the particles advantageously has the vast majority of particles, for example at least about 95% by weight, preferably at least about 99% by weight, more preferably at least about 99.5% by weight, be of an average diameter less than about 1 micron, and advantageously the particles are not rod-shaped with a single long dimension. The solid precursor metal salts or oxides after the milling procedure should have: a d99 of less than 2 microns, preferably less than 1.4 microns, more preferably less than 1 microns; a d98 of less than 2 microns, preferably less than 1 micron, more preferably less than 0.8 microns; a d50 of less than 0.9 microns, preferably less than 0.7 microns, more preferably less than 0.5 microns, for example between about 0.1 and 0.3 microns.

There are a wide variety of milling methods. At least partial attrition of particles can be obtained, for example, by use of 1) a pressure homogenizer such as that manufactured by SMT Ltd. having about 400 $kg/cm^2$ of pressure at a flow rate of about 1 L/min., although such a system often requires the slurry to be processed overnight; an ultrasonic homogenizer, such as is manufactured by Nissei Ltd., although such a system is energy intensive; 2) by wet milling in a sand grinder or wet-ball mill charged with, for example, zirconium silicate and/or zirconia beads with diameter about 0.2 mm to about 0.9 mm, typically about 0.5 mm; 3) alternately wet milling in a rotary sand grinder with or example, zirconium silicate and/or zirconia beads with diameter about 0.2 mm to about 0.9 mm, typically about 0.5 mm and with stirring at for example about 1000 rpm. Fast blade milling will not provide the desired attrition and small particle size distribution, and blade milling provides too much shear which degrades dispersants. The preferred method of providing injectable biocidal particles is wet ball milling the biocidal material in a ball mill with a sufficient amount of surfactants and with a milling agent, wherein at least 25% (preferably at least 50%, more preferably 100%) of the milling agent comprises zirconia (or optionally zirconium silicate) having an average diameter of between about 0.02 and 0.08 cm, preferably between about 0.03 and about 0.07 cm. We have found that wet ball milling with appropriate milling media and dispersants can advantageously modify particle size and morphology to form a uniform submicron slurry. In preferred embodiments of this invention, metal salt and/or oxide particulates are advantageously wet milled in a mall mill having milling media (beads) which preferably comprise a zirconium compound such as zirconium silicate or more preferably zirconium oxide. Other milling media, including steel and various metal carbides, can often be used, provided the density of the milling media is greater than 3 g/cc. A more important criteria for the milling media is that it have at least 25% by weight, preferably at least 50% or 100%, of the individual milling beads having an average diameter of between 0.3 and 0.8 mm, preferably between about 0.4 and about 0.7 mm. The size of the milling material is believed to be important, even critical, to obtaining a commercially acceptable product (milled in a commercially acceptable time, such as less than 30 minutes) if particles are present in the precursor composition.

The media need not be of one composition or size. Further, not all the milling material need be the preferred material, i.e., having a preferred diameter between 0.1 mm and 0.8 mm, preferably between 0.2 mm and 0.7 mm, more preferably between 0.3 mm and 0.6 mm, and having a preferred density equal to or greater than 3.8 $grams/cm^3$, preferably greater than or equal to 5.5 $grams/cm^3$, more preferably greater than or equal to 6 $grams/cm^3$. In fact, as little as 10% of this media will provide the effective grinding. The amount of the preferred milling media, based on the total weight of media in the mill, can be between 5% and 100%, is advantageously between 10% and 100%, and is preferably between 25% and 90%, for example between about 40% and 80%. Media not within the preferred category can be somewhat larger, say 1 mm to 4 mm in diameter, preferably from 1 mm to 2 mm in diameter, and advantageously also has a density equal to or greater than 3.8 grams/cm$^3$. Preferably at least about 10%, preferably about 25%, alternately at least about 30%, for example between about 50% and about 99%, of the media has a mean diameter of between about 0.1 mm to about 0.8 mm, preferably between about 0.3 mm and about 0.6 mm, or alternatively between about 0.3 mm and about 0.5 mm. The preferred milling procedure includes wet milling, which is typically done at mill setting between about 600 rpm and about 4000 rpm, for example between about 1000 rpm and about 2500 rpm. Faster revolutions provide shorter processing times to reach the minimum product particle size. Generally, the selection of the milling speed, including the speed in a scaled up commercial milling machine, can be readily determined by one of ordinary skill in the art without undue experimentation, given the benefit of this disclosure.

The precursor composition may comprise at least 0.5 moles hydroxide ion, preferably between about 0.75 to 2.5 moles hydroxide ion, per mole of copper (II) ions. For example, hydroxide source such as sodium hydroxide, ammonium hydroxide, and potassium hydroxide, and the like, or any mixtures thereof, or combinations thereof. The hydroxide source may be added to the solution as an aqueous solution or as a solid then dissolved in water.

The precursor composition solution can comprise water, and may comprise as much as about 70% water. Lower concentrations of water are preferred, e.g., between 60% to below 70% is preferred, between 50% to below 60% is more preferred, and below 50% is most preferred. The invention encompasses the use of precursor compositions which are substantially water-free, i.e., have less than about 3% water, but formulating such starting compositions is generally more expensive than formulating the preferred aqueous copper monoethanolamine precursor composition. Advantageously there is at least 5% water, preferably at least 10% water, and typically there is between 15% and 60% water in the precursor composition if all the metal ions are complexed by the alkanolamine.

The precursor composition advantageously comprises one or more counterions which partially or completely counterbalance the "charge" of the copper, for example inorganic counterions such as carbonate, chloride, sulfate, nitrate, borate, and the like; organic counterions such as formate, acetate, oxalate, and the like, or any mixtures thereof, or combinations thereof with a less than stoichiometric quantity of hydronium ions, e.g., bicarbonate in lieu of carbonate. The counterions can be provided by adding the respective acids to a composition comprising the monoethanolamine, where hydronium ions from the acid become associated with the amines. Carbonates can be added by adding carbon dioxide to an aqueous monoethanolamine composition. Advantageously, the quantity of acid added is between one and two equivalents per equivalent of copper dissolved or to be dissolved in the precursor composition. Preferably, the counterions are inorganic counterions. Organic acids such as formic acid, acetic acid, and oxalic acid are weak reducing agents; whereas nitric acid is a weak oxidizing agent. In some embodiments, less than about half the total equivalents of counterions in the precursor composition are organic counterions. In some embodiments, less than about half the total equivalents of counterions in the precursor composition are formates and oxalates. Preferably the precursor composition is substantially free of carboxylic acids, e.g., less than 10%, more preferably less than 2% or alternately about 0%, of the equivalents of counterions present in the precursor composition are carboxylates.

Advantageously the reaction composition is substantially free of common reducing agents, e.g., hydrazine. By substantially free of common reducing agents we mean less than about 0.1 moles, preferably less than 0.05 moles, more preferably less than 0.01 moles or no moles of common reducing agent per mole of copper ions in the precursor composition.

In some embodiments the reaction composition is substantially free of weak primary reducing agents, e.g., an aldohexose such as glucose. By substantially free of common reducing agents we mean less than about 0.02 moles, more preferably less than 0.01 moles or no moles of weak primary reducing agent per mole of copper ions in the precursor composition. Prior to or during the dissolution, a weak primary reducing agent optionally can be added in an amount and at conditions known in the art to convert copper(II) ions to copper(I) ions, e.g., one part of an aldohexose such as glucose to 1 part copper in a slurry having 3-4 parts water at a temperature of greater than about 50° C. will generally suffice.

In other embodiments the reaction composition comprises weak primary reducing agents, e.g., an aldohexose such as glucose. Generally having between about 0.03 and about 0.4 moles, typically between 0.04 moles and 0.1 moles of weak primary reducing agent per mole of copper ions in the precursor composition is sufficient to convert a substantial portion of copper(II) ions to copper(I) ions prior to the reduction by the thermal decomposition of the alkanolamine.

Without being bound to the theory, we believe the monoethanolamine is primarily responsible for the reduction of copper ions to copper metal. The MEA is operative to reduce either or both of copper(I) and/or copper(II) ions to copper metal powder.

The process of the invention can include the step of manufacturing the precursor complex. In one embodiment, a precursor complex is prepared following the process disclosed in co-owned U.S. Pat. No. 6,646,147, the disclosure of which is incorporated herein by reference thereto, which describes rapid dissolution of copper metal in an aqueous monoethanolamine-carbonate composition.

In an alternate embodiment, copper oxide (CuO, Cu$_2$O, or both) is dissolved in a monoethanolamine composition, for example in an aqueous monoethanolamine composition. Counterions may or may not be added. In one embodiment a cuprous oxide or copper oxide/hydroxide intermediate is dissolved in an MEA-containing composition.

In another alternate embodiment, copper hydroxide is dissolved in a monoethanolamine composition, for example in an aqueous monoethanolamine composition, to form the precursor composition. Counterions may or may not be added. In yet another alternate embodiment, copper carbonate is dissolved in a monoethanolamine composition, for example in an aqueous monoethanolamine composition, to form the precursor composition.

In yet another alternate embodiment, one or more copper salts such as soluble salts such as copper sulfate, copper chloride, and the like; one or more sparingly soluble copper salts such as copper carbonate, basic copper carbonate, basic copper sulfate (including particularly tribasic copper sulfate), basic copper nitrate, copper oxychloride, copper borate; basic copper borate, or any mixtures thereof, are dissolved or partially dissolved in a monoethanolamine composition, for example in an aqueous monoethanolamine composition, to form the precursor composition. Additional counterions may or may not be added.

Most precursor compositions that are solutions comprise water and excess alkanolamine. It is rare that the precursor composition is saturated with copper, and generally, copper salts and/or copper oxide may be at least partially soluble in the precursor composition.

The process involves heating this precursor composition to form a reaction composition. Typically the excess water and by-products of the reaction, are allowed to vaporize. Generally, exposure to air is not desired, though the process can go forward even with air exposure provided the exposure to oxygen is minimized. See, for example, U.S. Pat. No. 5,492, 681, particles of copper oxide can be formed if aqueous copper ammonia composition is placed in a vessel with excess ammonium salt and with oxygen, and then the mixture is stirred and heated to a temperature of between approximately 70° and 130° C. The instant process may be conducted at atmosphere pressure, under vacuum, or at an increased pressure, e.g., between about 1 and about 6 bars absolute pressure. In some embodiments the thermal decomposition process can take place in an inert environment or in a low-oxygen environment, for example in a atmosphere comprising one or more of an inert gas such as helium or nitrogen, water vapor, or organics including monoethanolamine and/or organic reaction by-products. The boiling point of MEA at one atmosphere is about 170° C. The flash point of MEA, open cup, is only about 93° C. Therefore, in the absence of an oxidizing environment such as in air, the thermal decomposition will provide vaporous byproducts that can be flammable or explosive. Eliminating oxygen eliminates the flammability/explosive mixture concern, and will also help prevent or delay the formation of copper oxide on the surface of newly formed copper powder.

We believe the reduction reaction takes place at a temperature of between about 95° to about 150° C., more likely at a temperature between about 100 to about 140° C.

It may be advantageous to perform the thermal decomposition at increased pressure or at reduced pressure. If run at reduced pressure, then the removal of volatiles can take place at reduced temperature. On the other hand, if run at increased pressure, then much of the energy used to vaporize water and ethanolamine will be saved, as these components may remain in fluid form and not vaporize. For example, the thermal decomposition can be performed in an inert atmosphere comprising one or more of water vapor, MEA vapor, helium, or nitrogen, at an absolute pressure of about 5 bars, and very little of the water will be evaporated, thereby providing a huge energy saving when compared to the energy requirements of distilling the water from the reaction mixture before reaching the reaction temperature.

Generally, we believe water is not necessary for the reduction reaction to proceed. Removing water by distillation involves a high energy cost. It may be advantageous to remove some water from the precursor composition by for example exerting pressure on the composition while the composition is in contact with a membrane that is more soluble to water than to ethanol (reverse osmosis), by contacting the precursor composition with a dehydrating agent such as anhydrous calcium sulfate and/or copper sulfate (absorption), or by en electrodialysis pretreatment wherein a voltage is imposed across an ion exchange membrane in contact with the precursor composition under conditions which will concentrate the precursor composition in active ingredients, in particular copper ions and MEA. Of course, the other option is to use an MEA source that has little or no water.

Generally, the process involves heating the precursor composition to a temperature between about 70° C. and about 170° C., for example between about 90° C. and about 155° C. We believe the reaction occurs when the temperature is between about 95° C. and 150° C., more likely starting to form visually apparent copper powder when the temperature exceeds about 110° C. Advantageously water and reaction byproducts are removed from the reaction composition by vaporization. Reusable material such as water/monoethanolamine vapor can be condensed and re-used.

It is important to note that the reduction of copper ions by monoethanolamine is believed to alter the structure of the monoethanolamine, (probably consuming at least one mole monoethanolamine per mole of copper reduced) so that this portion of the monoethanolamine can not be reused. There may be monoethanolamine that is not involved in a reduction reaction, and this MEA can be reclaimed and reused. In contrast, when formate or other reducing agent is used, we believe most or all the MEA can be recovered and reused, as the MEA will not change its structure.

The process is advantageously carried out in a fluid composition. In one embodiment, the fluid is converted into an aerosol, and the thermal conversion occurs in an oven. The particle size of the resulting copper can be influenced by the particle size of the individual droplets of the precursor composition introduced to the oven. The oven can be maintained at one temperature, or the oven can have different temperatures are different locations to maximize the reaction rate while preventing such fast vaporization of volatiles that droplets are broken apart.

Generally, the process produces high purity copper metal particles with a particle size that is variable (depending on process conditions), but which can not readily be made smaller than about 0.1 microns and can not readily be made larger than about 10 microns. Typical process conditions and adjuvants can provide spherical or round particles having a size that is between about 0.2 microns and about 1.5 microns. That is not to say that a large particle size distribution is made. It appears that at least 80% of the total weight of particles produced has a particle diameter within about 50% of the mean weight particle diameter.

Various embodiments include one or more of:

1) Adding reducing sugars;

2) Adding a surface active agent such as glycine, arabic gum, xanthan gum, and the like, preferably before the copper powder is formed;

3) Adding a surface active agent such as an azole, preferably after the copper powder is formed; and 4) Adding copper to the copper-MEA precursor composition to dissolve additional copper, either before or concurrent with converting a portion of the complexed copper(I) ions to copper(I) ions.

In one embodiment of the invention, copper(II) ions can be reduced to copper(I) ions by exposure to a weak reducing agent, e.g., by exposure of the material to a reducing sugar such as glucose. At such time, either the precursor composition can be contacted with additional copper metal, copper oxides, and/or copper salts (as the conversion of copper(II) ions to copper(I) ions results in excess MEA compared to the amount of MEA needed to solubilize the copper). Alternately, the thermal decomposition can proceed directly from the point where reducing sugar is added to the reaction composition.

In one embodiment, one or more surface-active agents can be added to the reaction mixture to stabilize the copper powder and to retard surface oxidation. Copper powder is often used for forming electrical connections, and a layer of copper oxide on a particle surface can increase chances of failure in the resultant product. Exemplary surface-active agents include azoles and their substituted derivatives, particularly aromatic azoles (including diazoles, triazoles, and tetrazoles), such as benzotriazole, tolyltriazole, 2,5-(aminopentyl)benzimidazole, alkoxybenzotriazole; imidazoles, such as oleyl imidazoline; thiazoles, such as mercaptobenzothiazole, 1-phenyl-5-mercaptotetrazole; thiodiazoles, halogen-resistant azoles, and combinations thereof. Thiodiazoles substituted on the ring by a mercapto group and/or an amino group and triazoles substituted by a mercapto group and/or an amino group are effective. Examples of halogen-resistant azoles include 5,6-dimethyl-benzotriazole; 5,6-diphenylbenzotriazole; 5-benzoyl-benzotriazole; 5-benzyl-benzotriazole and 5-phenyl-benzotriazole. Alkyl-substituted aromatic trazoles, such as tolyltriazole are particularly preferred. Azoles are particularly useful with copper-containing powders, such as pure copper or copper alloys, e.g. copper-zinc. These compounds form a film on the particles, and are advantageously solubilized in a solvent and contacted with the copper particles.

The particle size of copper powder can be reduced by milling after forming the ciopper powder. U.S. Pat. No. 6,432,320 describes a process of manufacturing a 0.05 micron powder for refrigerants by ball milling commercially available spherical 1-5 microns particle size copper particles.

In one embodiment, the precursor composition comprises complexed nickel (II) ions.

In an alternative embodiment, the precursor composition comprises complexed metal ions wherein the metal ion has a standard reduction potential from about −0.30 volts to about 0.6 volts in water solution at 25° C.

In one important embodiment, the invention includes a process for producing micron-sized to sub-micron-sized copper powder comprising the steps of: 1) providing a precursor composition comprising, or consisting essentially of, a solution of more than 5% copper and more than 20% monoethanolamine, by weight; and 2) heating the precursor composition to a temperature wherein copper monoethanolamine complex is converted to copper powder. Alternate embodiments comprise 1) providing a precursor composition comprising, or consisting essentially of, a solution of more than 5% copper, more than 20% monoethanolamine, and more than 0.2% carbonate as weight % carbon dioxide; and 2) heating the precursor composition to a temperature wherein copper monoethanolamine complex is converted to copper powder. A third important embodiment comprises 1) providing a precursor composition comprising, or consisting essentially of, a solution of more than 12% copper, more than 25% monoethanolamine, and more than 0.2% of a counterion, wherein less than one half the equivalents of the counterion are low molecular weight organic acids; and 2) heating the precursor composition to a temperature wherein copper monoethanolamine complex is converted to copper powder. In each of the above embodiments, advantageously no common reducing agents are present in or added to the precursor composition; the precursor composition comprises less than 0.1 moles of a low molecular weight organic acid per mole of dissolved copper; the precursor composition is substantially free of low molecular weight organic acid (i.e., less than 0.1 moles low molecular weight organic acid per mole of copper); the precursor composition comprises at least 0.5 mole of hydroxide ion per mole of copper ion; and advantageously the heating is to a temperature between about 95° and about 150° C., more beneficially between about 105° C. and 140° C. In each of the above embodiments, advantageously at least one mole of monoethanolamine is consumed by the reduction process per mole of copper powder formed.

A fourth important embodiment comprises 1) providing a precursor composition comprising, or consisting essentially of, a solution of greater that 5% nickel, more than 20% monoethanolamine and 2) heating the precursor composition to a temperature wherein nickel monoethanolamine complex is converted to nickel power.

A fifth embodiment comprises 1) providing a precursor composition comprising, or consisting essentially of, a solution of 5% metal salt, more than 15% monoethanolamine, wherein the metal ion has a standard reduction potential from about −0.30 volts to about 0.6 volts in water solution at 25° C.

EXAMPLES

Certain embodiments of this invention, as well as certain advantages of this invention, are illustrated by the preceding non-limiting examples. Although only a limited number of examples are disclosed herein, in the interests of brevity and clarity, it will be apparent to those skilled in the art that many modifications, both to materials and methods, may be practiced without departing from the purpose and interest of this invention.

While the Examples will be discussed individually, Table 1 below summarizes important information for a number of examples. The monoethanolamine:copper ion mole ratio varied from about 1.5 to about 3.5 for these examples. The glucose:copper mole ratio varied from about 0 to about 0.35. Copper recovery is typically greater than 98%.

| Example | MEA/Cu mole ratio | Cu recovery | glucose/Cu ratio | anions | Process | Diameter, microns |
|---|---|---|---|---|---|---|
| 2 | 3.5 | 92% | 0 | $CO_3$ | CMC + ΔH/vac | 1-2 |
| 3 | 3.5 | 98% | 0 | $CO_3$ | CMC + gum + ΔH/vac | ~1 |
| 4 | 3.5 | 98% | 0.04 | $CO_3$ | CMC + glu + ΔH/vac | <1 |
| 5 | 3.5 | 98% | 0.07 | $CO_3$ | CMC + glu + ΔH/vac | <1 |
| 6 | 2.4 | 97% | 0.05 | $CO_3$/OH | CMC + $CuCO_3$ + glu + ΔH/vac | NM |
| 7 | 2.5 | 98% | 0 | $CO_3$/OH | CMC + ΔH/vac + $CuCO_3$/$Cu(OH)_2$ + ΔH/vac | 1.3* |
| 8 | 1.5 | NM | 0 | $SO_4$/OH | $CuSO_4$ + NaOH + ΔH/vac | 0.3-0.4 |
| 9 | 7.8 | | 0.35 | $SO_4$/OH | $CuSO_4$ + NaOH + glu + ΔH/vac + MEA + ΔH/vac | 0.2 (3 agg) |
| 10 | 1.5 | | 0.34 | $SO_4$ | $CuSO_4$ + NaOH + glu + MEA + ΔH/vac | ~0.9 |
| 11 | 3.5 | 99.6% | | $CO_3$/OH | CMC + ΔH/vac + NaOH + ΔH/vac | ~1 (3.6 agg) |

*Estimated from surface area

Example 1

About 25 g of an aqueous copper monoethanolamine carbonate ("CMC") solution (d=1.25 g/cc, 9.6% Copper & 32.5% MEA) was agitated and heated in a beaker at a boiling temperature. After bulk of the solution was evaporated, the decomposition of CMC started spontaneously and produced a brown-colored slurry. Brown-colored powers were separated from slurry through filtration. The powders were washed with DI water and a final wash of acetone (it will be referred as standard method later). After drying in 50° C. oven, the power was analyzed for copper by iodometric titration. The copper content was found to be 94%.

The CMC solution contained 32.5% MEA, 9.6% copper, up to about 10% carbon dioxide (as carbonate), and the balance, e.g., about 50% by weight, comprised water. It is believed that most of the water was evaporated from the CMC solution prior to the reaction taking place, by which we infer that the reaction takes place at faster rates at a temperature higher than 100° C.)

Example 2

About 255 grams of the same CMC solution used in experiment #1 was placed into a 500-ml Erlenmeyer filtration flask. The solution was agitated and heated under partial vacuum (using water pump) until the composition started to boiling. After about 100-150 g water was evaporated, the brown-colored particles started to appear in the reaction media. The evaporation and decomposition of the CMC solution was continued for about 10 minutes until the reaction media turned into brown-colored slurry with some white-colored fume visible above the slurry surface. After separation of the copper powders from the slurry, the powder was given the standard wash and dry. There was about 24.5 grams of copper in the CMC precursor composition, and 22.5 grams of dried copper powder was recovered, giving about 92% recovery. The copper content of the powders were found to be about 105% by iodometric titration. Scanning microscopic (SEM) pictures of the obtained copper powders revealed agglomerates of particles with uniform primary particle sizes between 1-2 microns.

Example 3

This experiment was similar to that in #2 but 252 g CMC was mixed with 0.25 g Rodopol 23 (xanthan Gum) prior to beginning the thermal decomposition process. There was about 24.2 grams copper in the CMC precursor composition, and 23.9 g dried copper powder was recovered, giving better than 98% recovery. The particle size of the powders was slightly reduced (to the eye) compared to the particles obtained in Example 2.

Example 4

This experiment was similar to that in #2 but 250 g CMC was mixed with 2.5-g glucose to form the precursor composition. About 23.3 g dried copper powder was recovered, giving 97% recovery. The particle size of the powders was significantly reduced (to the eye) comparing to previous batches.

Example 5

This experiment was similar to that in #4 but 5-g glucose was used. About 23.8-g dried copper powder was recovered, so the recovery was about 99%. The particle size of the powders was slightly reduced (to the eye) from experiment #4, but was again significantly reduced as compared to those formed in Examples 1 to 3.

Example 6

This experiment was similar to that in #5 but 251-g CMC, 5-g glucose and 22-g copper carbonate (56% Cu) were admixed to form a precursor composition. The composition appeared to form a solution. The precursor composition therefore had about 12.3 grams copper from the added copper carbonate and 24.1 grams copper from the CMC solution, for a total of 36.5 grams copper. About 34.5-g dried copper powder was recovered, giving a 94% recovery.

Examples 7

About 10 kg CMC solution (9.5% copper), was weighed and boiled it until about half of the original volume left. About 860 g basic copper carbonate were added to the reactor and continued to boil. The conversion reaction to copper powder was completed when the reaction temperature reached about 150 C. Obtained 1350 g fine powders with a surface area of 0.47 m2/g and a particle size of approximately 1.5 micron.

Example 8

About 340-g MEA were mixed with 230-g DI-water in a beaker and then agitated. About 273-g copper sulfate pentahydrate (CSP) was added and allow to dissolve completely into MEA solution. Then, 477-g caustic solution (18%) was added and the solution in beaker turned into viscous slurry. The slurry was heated and evaporated to a boiling temperature of about 150° C. After maintaining the temperature above 150° C. for a few minutes, the reaction was completed. Copper particles were filtered and washed with DI-water, and then a 15-ml acetone final wash. Some purple-colored (probably due to small particle size rather than surface oxidation) copper powder was obtained. It contained 97.7% copper and had a surface area of 2.11 m2/g and a particle size of less than 0.5 micron.

Example 9

About 20-g CSP was weighed and dissolved it into 60-ml DI-water. About 36-g 18% NaOH solution was added to form copper hydroxide slurry with good agitation. Then 5-g glucose was added to the slurry. The slurry was heated up near boiling temperature. The slurry gradually changed color from blue copper hydroxide into green, then yellow and finally pinkish cuprous oxide. At this point, 39-g MEA (85%) solution was added to the reactor and the slurry was continuously heated and converted. We obtained copper powders with bimodal particle size distribution (0.2 and 3 microns, respectively). That 3 micron particle was actually a cluster of smaller copper particles.

Example 10

About 80-g CSP and 250 ml DI-water were mixed until all CSP crystals dissolved. About 20-g glucose and 100-g MEA were added. The solution was heated to near the boiling temperature. The solution slowly turned into yellow, red and then to purple slurry. Copper powders were obtaining having a 0.76 m2/g in surface area and a particle size less than 1 micron.

Example 11

About 3177-g CMC (9.5% copper) solution was weighed and evaporated until a redish-color precipitate formed in the solution. Then 515-g (18% NaOH) solution was added to the solution. The reaction of caustic and the concentrated CMC formed viscous green-colored slurry. After continuous evaporation of the slurry, the color of the slurry turned into yellow, then light red, and then dark red when converted to copper particles at the end. 300-g copper powder was collected after washing and drying of the powder. After de-agglomerating the powder through a hammer mill, the particle size was 3.6 microns by Microtrack. Under the microscope, we found that each particle was a cluster of 1 to 3 copper particles sticking together.

Example 12

Nickel sulfate was dissolved into MEA and NaOH solution and then heated to boiling temperature. Metal powder was visually observed on the magnetic stir bar and a metal layer was deposited on the side of the beaker indicating the formation of nickel metal.

Example 13

This example shows the utility of wet ball milling precursor salts to form submicron particles.

Comparative Example 13A

In this comparative example, copper hydroxide was wet-milled using 2 mm zirconium silicate as the milling medium. The slurry, a commercially available magnesium stabilized form of copper hydroxide particulate material, Champ DP® available from available from Phibro-Tech., Inc., has particles with a $d_{50}$ of about 0.2 microns. While the $d_{50}$ of the material was <0.2 microns, about 13% by weight of the material had diameters between 0.4 and 1.5 microns, and 1% by weight had a diameter of about 2 microns or higher. In terms of numbers of particles, there were thousands to millions of particles with a diameter less than 0.4 microns for every particle with a diameter greater than 1 micron. The Champ DP® material was placed in a mill with about a 50% by volume loading of 2 mm zirconium silicate milling beads. Samples were removed intermittently and the particle size distribution was determined. Wet milling with 2 mm zirconium silicate milling media had no substantial effect—wet milling for hours gave only a very slight decrease in particle size, and a small shift in the particle size distribution. Milling for a day or more did not provide a slurry with the desired particle size distribution, that is, less than 1% by weight of particles having a diameter greater than 1 micron.

Comparative Example 13B

Copper hydroxide (CHAMP FLOWABLE™, available from Phibro-Tech, Inc.) was wet ball milled with glass media having an average particle size of 0.7 to 0.9 mm. The copper hydroxide was very resistant to attrition using this milling media.

The milling media was then changed to 0.6-1.0 mm zirconium silicate. The CHAMP FLOWABLE™ material has a small initial $d_{50}$ of about 0.25, and while extended milling could give a particle size reduction to eventually provide a $d_{50}$ near 0.2 microns, there remained an excess of material over 1 micron in diameter. The mill was a KDL Pilot Unit available from CB Mills, run at 1200 RPM with a 0.3 micron gap spacing, 1120 ml of 0.6-1.0 mm zirconium silicate, with 700 ml of process fluid, a residence time of 1.5 to 14 minutes with recycle. Adding Rhodopol™ 23 to the slurry had some effect, but viscosity breakdown suggested dispersant breakdown. After 20 minutes of milling, there was still 15-20% by weight of particles having an average diameter greater than 1 micron. After 30 minutes of milling, there was still 10-15% by weight of particles having an average diameter greater than 1 micron. After 60 minutes of milling, there was still about 10% by weight of particles having an average diameter greater than 1 micron. The reduction in the amount of material having an effective diameter greater than 1 micron was not fast enough to provide a commercially useful precursor material if the goal is to provide copper of particle size well below 1 micron.

Comparative Example 13C

Milling particles with a fast blade mixer is limited in the lower size limit it can produce, and the particle size distribution resulting from such milling is broad. We formed a mixture of 40 parts sodium tetraborate decahydrate, 54 parts tap water, and 8 parts copper hydroxide comprising dispersants and having a mean particle size of 2.5 microns (as measured by a Micromeritics Sedigraph 5100). This mixture was "milled" for 60 minutes using a laboratory dispersator (Indco Model HS-120T-A) operating at 3,000 rpm. After "milling" for 60 minutes, the $d_{50}$ was found to be 1.5 microns.

Example 13D

Copper hydroxide (CHAMP Formula II™, available from Phibro-Tech, Inc.) was wet ball milled with 0.6 to 1 mm zirconium silicate milling material. The mill was a KDL Pilot Unit available from CB Mills, run at 1200 RPM with a 0.3 micron gap spacing, 1120 ml of 0.6-1.0 mm zirconium silicate, with 700 ml of process fluid, a residence time of 3.3 to 30 minutes with recycle. Though the original CHAMP Formula II™ material had 15% of the material having a particle size of 1 micron or greater, as the residence time increased particle size decreased until the $d_{99}$ was at about 1 micron or less. There was also a significant reduction in the $d_{50}$, from about 0.28 microns before milling to about 0.2 microns after milling. The $d_{99}$ was not able to be reduced below about 0.7 microns—there remained about 2% or more of material having a particle size above 0.7 microns.

Five samples of particulate copper salts made following standard procedures known in the art and were milled according to the method of this invention. The first two samples were copper hydroxide—one with an initial particle size $d_{50}$ of about 0.2 microns (the material of comparative example A), and the second with an initial $d_{50}$ of 2.5 microns. A basic copper carbonate (BCC) salt was prepared and it had an initial $d_{50}$ of 3.4 microns. A tribasic copper sulfate salt was prepared and this material has a $d_{50}$ of 6.2 micron. Finally, a copper oxychloride (COc) sample was prepared and this material has an initial $d_{50}$ of 3.3 microns. Selected surface active agents were added to each slurry, and the initial slurries were each in turn loaded into a ball mill having 0.5 mm zirconium silicate (density 3.3-3.8 grams/cm3) at about 50% of mill volume, and milled at about 2600 rpm for about a half an hour. The particle size distribution of the milled material was then determined. The particle size distribution data is shown in Table 5.

TABLE 1

Particle Size Distribution Before/After Milling (0.5 mm Zirconium Silicate)

| Material | $d_{50}$ | % < 10μ | % < 1μ | % < 0.4μ % | <0.2μ |
|---|---|---|---|---|---|
| Cu(OH)$_2$, before milling | ~0.2 | 99% | 84% | 64% | 57% |
| Cu(OH)$_2$, after milling | <0.2 | 99% | 97% | 95% | 85% |
| Cu(OH)$_2$, before milling | 2.5 | 99% | 9% | — | — |
| Cu(OH)$_2$, after milling | 0.3 | 99.7% | 95% | 22% | — |
| BCC*, before milling | 3.4 | 98% | 1.2% | — | — |
| BCC*, after milling | <0.2 | 99% | 97% | 97% | 87% |
| TBS*, before milling | 6.2 | 70% | 17% | — | — |
| TBS*, after milling | <0.2 | 99.5% | 96% | 91% | 55% |
| COc*, before milling | 3.3 | 98.5% | 3% | — | — |
| COc*, after milling | 0.38 | 99.4% | 94% | 63% | — |

Milling sparingly soluble inorganic biocidal salts with the more preferred zirconium oxide milling beads will provide a smaller $d_{50}$ and will further reduce the amount of material having a diameter greater than 1 micron to less than 1%.

Example 13E

A sample of zinc borate, Firebrake™ ZB commercially available from US Borax, was obtained. The $d_{50}$ of the commercial product was 7 microns. The product was wet ball milled as described herein, and the resulting slurry had approximately at least 80%, and in one case had 91%, by weight of the material having a particle size less than 0.2 microns The invention is meant to be illustrated by these examples, but not limited to these examples.

The invention claimed is:

1. A process for producing micron-sized to sub-micron-sized copper powder comprising the steps of: 1) providing an aqueous precursor composition comprising a solution of more than 5% copper ions, more than 10% water, and more than 20% monoethanolamine, by weight, with the proviso that there is less than 0.8 moles of a low molecular weight organic acid selected from the group consisting of formic acid, acetic acid, and oxalic acid per mole of copper ions; and 2) heating the precursor composition to a temperature wherein the copper ions are converted to copper powder, said powder having greater than 90% by weight copper and having a mean diameter of between about 0.02 microns and about 5 microns.

2. The process of claim 1 wherein the temperature is between 130° C. and 155° C.

3. The process of claim 1 wherein the composition comprises less than 0.4 moles of low molecular weight organic acid selected from the group consisting of formic acid, acetic acid, and oxalic acid per mole of copper ions.

4. The process of claim 1 wherein the composition comprises less than 0.4 moles total of a low molecular weight organic acid selected from the group consisting of formic acid and oxalic acid and of hydrazine per mole of copper ions.

5. The process of claim 1 wherein the composition is substantially free of a low molecular weight organic acid selected from the group consisting of formic acid, acetic acid, and oxalic acid and of hydrazine.

6. The process of claim 1 wherein at least a portion of the copper ions in the precursor composition are in the form of particles of copper salts, copper hydroxides, copper oxides, or mixtures or combinations thereof.

7. The process of claim 1 wherein the mole ratio of monoethanolamine to copper ions is at least 1.5:1 and wherein the aqueous precursor composition comprises between 15% and 60% of water.

8. The process of claim 1 wherein the powder has a mean diameter of between about 0.2 microns and about 1.3 microns.

9. The process of claim 1 wherein there is less than 0.4 moles hydrazine is present per mole of copper ions in the precursor composition.

10. The process of claim 1 wherein the precursor composition comprises less than 0.1 moles of a low molecular weight organic acid selected from the group consisting of formic acid, acetic acid, and oxalic acid per mole of copper ions and wherein the aqueous precursor composition comprises between 15% and 60% of water.

11. The process of claim 1 wherein the precursor composition is substantially free of low a molecular weight organic acid selected from the group consisting of formic acid and oxalic acid.

12. The process of claim 1 wherein the heating is to a temperature between about 95° C. and about 150° C.

13. The process of claim 1 wherein at least one mole of monoethanolamine is consumed by the reduction process per mole of copper powder formed.

14. The process of claim 1, wherein the precursor composition comprises more than 12% copper, more than 25% monoethanolamine, between 15% and 60% of water, and more than 0.2% of a counterion, wherein less than one half the equivalents of the counterion are low molecular weight organic acids selected from the group consisting of formic acid, acetic acid, and oxalic acid.

15. A process for producing micron-sized to sub-micron-sized copper powder comprising the steps of: 1) providing a precursor composition comprising at least 10% water by weight, copper ions and monoethanolamine, with the proviso that the mole ratio of ethanolamine to copper ions is at least 1 and there is less than 0.4 moles total of a low molecular weight organic acid and hydrazine per mole of copper ions, wherein the low molecular weight organic acid has a molecular weight equal to or less than that of oxalic acid ; and 2) heating the precursor composition to a temperature wherein the copper ions are converted to copper powder, said powder having greater than 90% by weight copper and having a mean diameter of between about 0.02 microns and about 5 microns.

16. The process of claim 15 wherein no common reducing agents selected from the group consisting of formic acid, oxalic acid, and hydrazine are added to the precursor composition.

17. The process of claim 15 wherein the precursor composition comprises less than 0.1 moles of low molecular weight organic acid having a molecular weight equal to or less than that of oxalic acid per mole of dissolved copper ions.

18. The process of claim 15 wherein the precursor composition is substantially free of low molecular weight organic acid having a molecular weight equal to or less than that of oxalic acid.

19. The process of claim 15 wherein the heating is to a temperature between about 95° C. and about 150° C.

20. The process of claim 15 wherein at least one mole of monoethanolamine is consumed by the reduction process per mole of copper powder formed.

21. A process for producing micron-sized to sub-micron-sized copper powder comprising the steps of: 1) providing a precursor composition consisting essentially of: copper ions, monoethanolamine, an inorganic counterion, at least 10% by weight of water, and optionally an reducing sugar, wherein the mole ratio of monoethanolamine to copper ions is at least 1:1; and 2) heating the precursor composition to a temperature wherein copper ions are converted to copper powder, said powder having greater than 90% by weight copper and having a mean diameter of between about 0.02 microns and about 5 microns.

22. The process of claim 21 wherein no common reducing agents selected from the group consisting of formic acid, oxalic acid, and hydrazine are added to the precursor composition.

23. The process of claim 22 wherein the precursor composition comprises less than 0.1 moles of a low molecular weight organic acid per mole of copper ions, wherein the low molecular weight organic acid has a molecular weight equal to or less than that of oxalic acid.

24. The process of claim 22 wherein the precursor composition is substantially free of low molecular weight organic acid selected from the group consisting of formic acid, acetic acid, and oxalic acid.

25. The process of claim 22 wherein the heating is to a temperature between about 95° C. and about 150° C.

26. The process of claim 22 wherein the precursor composition comprises between 2.5 and about 4 moles of monoethanolamine per mole of copper, and wherein at least one mole of monoethanolamine is consumed by the reduction process per mole of copper powder formed.

27. The process of claim 22 wherein the mole ratio of monoethanolamine to copper ions is at least 1.5:1.

28. A process for producing micron-sized to sub-micron-sized metal powder comprising the steps of: 1) providing a precursor composition comprising at least 10% by weight of water, monoethanolamine-reducible metal ions and monoethanolamine, wherein the monoethanolamine-reducible metal ions each have a standard reduction potential from about −0.30 volts to about 0.6 volts in water solution at 25° C., and wherein the mole ratio of monoethanolamine to monoethanolamine-reducible metal ions is at least 1:1, with the proviso that the precursor composition comprises less than 0.8 moles total of metal-reducing-organic acids and of hydrazine per mole of monoethanolamine-reducible metal ions; and 2) heating the precursor composition to a temperature wherein the metal ions are converted to metal powder, said powder having a mean diameter of between about 0.02 microns and about 5 microns.

29. The process of claim 28 wherein the temperature is between 130° C. and about 150° C.

30. The process of claim 28 wherein the composition comprises less than 0.8 moles of metal-reducing-organic acids per mole of monoethanolamine-reducible metal ions.

31. The process of claim 28 wherein the composition comprises less than 0.4 moles total of metal-reducing-organic acids and of hydrazine per mole of monoethanolamine-reducible metal ions.

32. The process of claim 28 wherein at least half of the moles of monoethanolamine-reducible metal ions comprise copper ions, nickel ions, or both.

33. The process of claim 28 wherein at least a portion of the monoethanolamine-reducible metal ions in the precursor composition are in the form of particles of metal salts, metal hydroxides, metal oxides, or mixtures or combinations thereof 34. The process of claim 28 wherein the mole ratio of monoethanolamine to monoethanolamine-reducible metal ions is at least 1.5:1 and wherein the precursor composition comprises from 15% to 60% water.

35. The process of claim 28 wherein the powder has a mean diameter of between about 0.2 microns and about 1.3 microns.

36. A process for producing micron-sized to sub-micron-sized nickel powder comprising the steps of: 1) providing a precursor composition comprising more than 10% by weight of water, nickel ions and monoethanolamine, wherein the mole ratio of monoethanolamine to nickel ions is at least 1:1, with the proviso that the precursor composition comprises less than 0.8 moles total of nickel-reducing-organic acids and of hydrazine per mole of monoethanolamine-reducible nickel ions and 2) heating the precursor composition to a temperature wherein the nickel monoethanolamine complex is converted to nickel powder.

37. The process of claim 36 wherein the temperature is between 130° C. and about 155° C.

38. The process of claim 36 wherein the composition comprises less than 0.8 moles of nickel-reducing-organic acids per mole of nickel ions.

39. The process of claim 36 wherein the composition comprises less than 0.4 moles total of nickel-reducing-organic acids and of hydrazine per mole of nickel ions.

40. The process of claim 36 wherein at least a portion of the nickel ions in the precursor composition are in the form of particles of metal salts, metal hydroxides, metal oxides, or mixtures or combinations thereof.

41. The process of claim 36 wherein the mole ratio of monoethanolamine to nickel ions is at least 1.5:1.

42. The process of claim 36 wherein the powder has a mean diameter of between about 0.2 microns and about 1.3 microns.

* * * * *